United States Patent [19]

Woodburn

[11] Patent Number: 4,932,830
[45] Date of Patent: Jun. 12, 1990

[54] MOTOR VEHICLE AND BOAT TRAILER

[76] Inventor: Clarence A. Woodburn, 43884 Pioneer Ave., Hemet, Calif. 92344

[21] Appl. No.: 329,163

[22] Filed: Mar. 17, 1989

[51] Int. Cl.⁵ .................................................. B60P 3/08
[52] U.S. Cl. ............................ 414/495; 410/24; 410/26; 280/414.1; 414/532; 414/537; 414/559
[58] Field of Search ............... 414/495, 559, 529, 532, 414/537; 280/414.1, 415.1, 401; 410/3, 24, 26

[56] References Cited

U.S. PATENT DOCUMENTS

| | | | |
|---|---|---|---|
| 1,573,172 | 2/1926 | Laffey | 414/495 X |
| 3,677,425 | 7/1972 | Patten | 410/26 X |
| 3,718,227 | 2/1973 | Swift | 280/414.1 |
| 3,870,339 | 3/1975 | Goff | 414/495 X |
| 3,902,613 | 9/1975 | Newland | 410/3 X |
| 4,068,772 | 1/1978 | Prudhomme | 410/26 X |
| 4,221,420 | 9/1980 | Vencill et al. | 296/1 A |
| 4,406,477 | 9/1983 | McDonald | 410/24 X |
| 4,420,165 | 12/1983 | Goodin | 280/414.1 |
| 4,469,346 | 9/1984 | Low | 280/414.1 |
| 4,560,316 | 12/1985 | Daniels | 414/481 |
| 4,589,814 | 5/1986 | Cates | 410/24 X |
| 4,705,289 | 11/1987 | Weber | 280/414.1 |
| 4,784,545 | 11/1988 | Lawrence | 410/26 |
| 4,801,229 | 1/1989 | Hanada et al. | 410/26 |

Primary Examiner—David A. Bucci
Assistant Examiner—James R. Bidwell
Attorney, Agent, or Firm—John E. Benoit

[57] ABSTRACT

An automobile/boat trailer for transporting an automobile with a boat supported above the automobile. Four corner vertical support columns are mounted on a trailer having standard rails for supporting an automobile. A boat trailer cradle is mounted so as to be vertically slidable along the support columns. Cables are attached to the trailer cradle and pass over pulleys secured to the top of each column. The cables are secured at their other ends to a winch for raising and lowering the boat cradle. Safety locks are provided for preventing the lowering of the boat cradle if the cables fail to support the cradle.

4 Claims, 5 Drawing Sheets

MOTOR VEHICLE AND BOAT TRAILER

This invention relates generally to trailers for transporting vehicles or the like and more specifically to a trailer for transporting both a vehicle such as an automobile and a boat.

BACKGROUND OF THE INVENTION

Trailers have been proposed and used for transporting many vehicles and even multiple vehicles Trailers have also been proposed for specifically transporting a vehicle such as an automobile and a boat on the same trailer.

Many particular mechanical devices have been proposed and/or used for placing a vehicle and boat on a trailer and for unloading both vehicles. Most of these devices are fairly complicated and require substantial hardware in order to properly load and carry the vehicles. Further, many of the trailers are of an extended length due to the fact that the vehicles being transported are necessarily in a position which does not allow the most compact length. Additionally, there is no provision for adjusting the distance between vehicles once they are loaded into position.

SUMMARY OF THE INVENTION

The present invention provides a substantially simplified mechanism for loading a boat on a trailer, elevating the boat to allow an automobile or the like to be driven on the trailer, and adjusting the height of the boat above the vehicle so as to provide the maximum use of the trailer as to length and height and to reduce the center of gravity once the vehicles are loaded.

The invention includes these desirable characteristics by providing a trailer having standard rails for supporting an automobile with four corner vertical support columns mounted on the trailer. A boat cradle is mounted so as to be vertically slidable along the support columns and cables are secured to the means for mounting the cradle and pass over pulleys which are secured to the top of each column. The cables are secured at their other ends to a winch, preferably motor-driven, for raising and lowering the boat cradle. Thus, when the boat cradle is raised, the vehicle is driven onto the lower part of the trailer and the boat may be lowered to be just above the vehicle and is held there by the cables. Preferably, safety locks are provided for preventing the lowering of the boat cradle if the cables fail to support the cradle.

BRIEF DESCRIPTION OF THE DRAWINGS

The invention and the objects of the invention will be more clearly understood from the following description, taken together with the drawings

DETAILED DESCRIPTION OF THE PREFERRED EMBODIMENT

Figure 1:
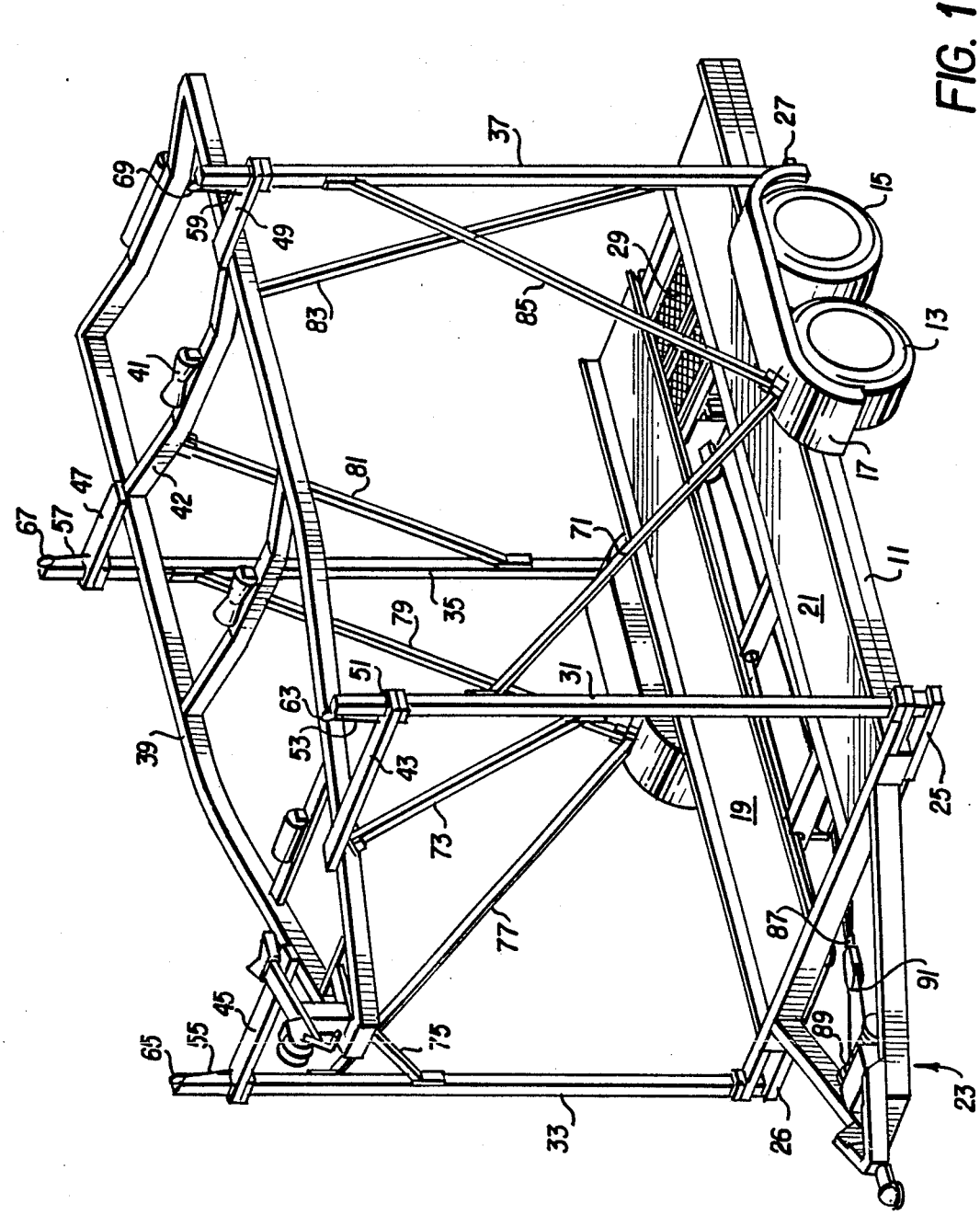
FIG. 1 is a perspective view of the trailer with the boat cradle raised but with no vehicle or boat in the trailer.

Referring to FIG. 1, there is shown the trailer of the present invention, which includes a car transport frame 11 having tandem axles with wheels 13 and 15 and fender 17 over the wheels. As in a standard car transport frame, there are provided rails 19 and 21 upon which a four-wheel vehicle can sit. The frame also includes trailer hitch 23, which may be attached to any towing vehicle properly equipped.

The trailer is shown in the position that is assumed when it is carrying a vehicle and a boat, but both have been omitted in order to be able to show the details of the carrier in its position of use. The trailer has welded thereto members 25 and 26, which support vertical columns 31 and 33, and cross-member 27, which supports vertical columns 35 and 37. Boat trailer cradle 39 includes standard support rollers 41 and has welded thereto arms 43, 45, 47, and 49. Each of the arms includes an orifice 51 at the distal end which is geometrically configured to pass over the associated column, such as column 31, and is vertically slidable on the column.

Cables 53, 55, 57, and 59 are secured to their respective arms as indicated. These cables pass over pulleys 63, 65, 67, and 69, which are mounted adjacent the tops of the columns. The columns are preferably hollow and the cables pass downwardly through each of the columns.

In order to stabilize the frame, there are provided braces 71, 73, 75, 77, 79, 81, 83, and 85. These braces are removably secured to the columns, as will be illustrated as the description proceeds. With the columns arranged as shown, they provide longitudinal and transverse stabilization of the entire trailer when it is in its raised position.

Figure 2:
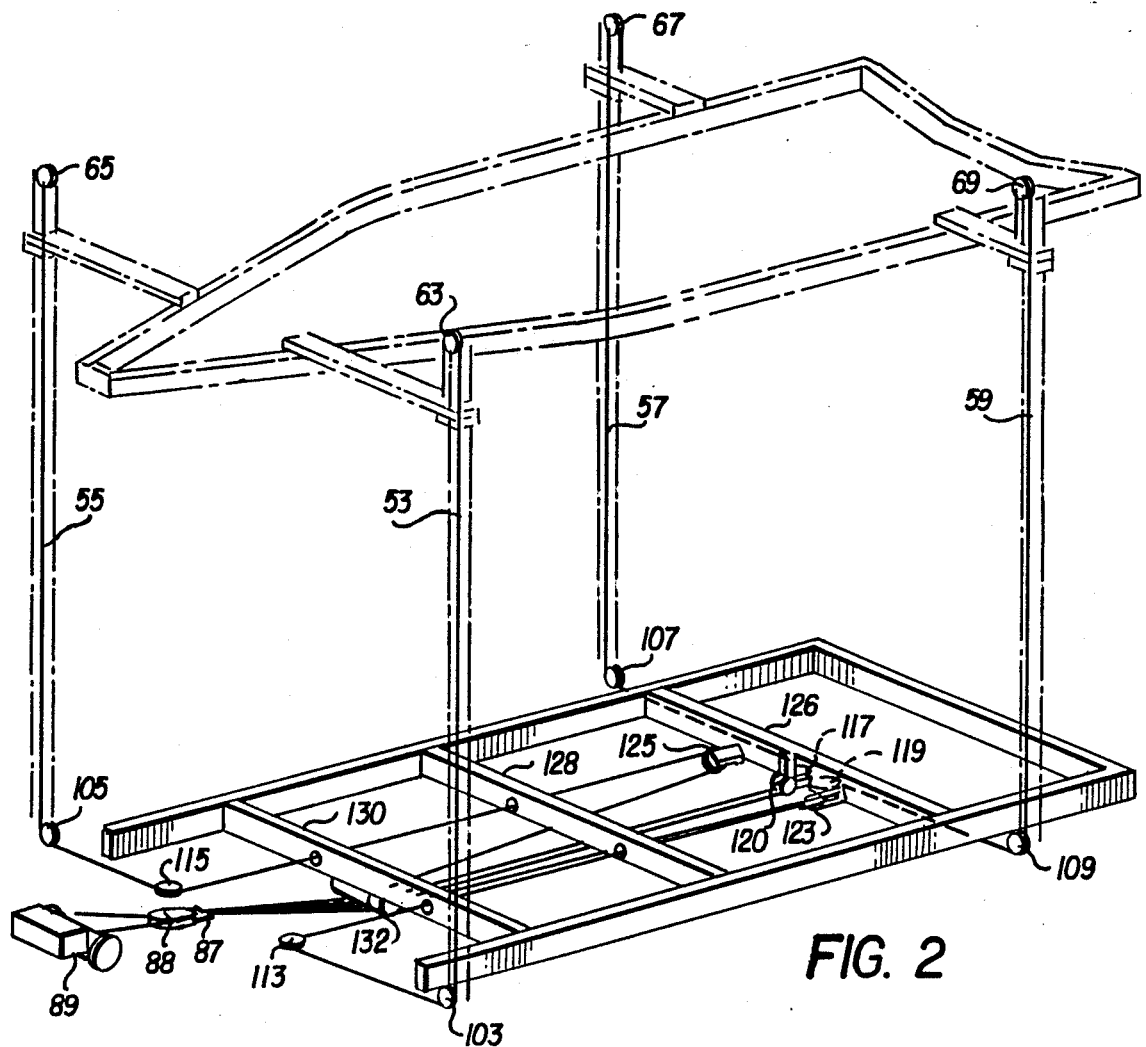
FIG. 2 is a perspective view of the frame of the trailer with the cable network illustrated therein.
Figure 3:
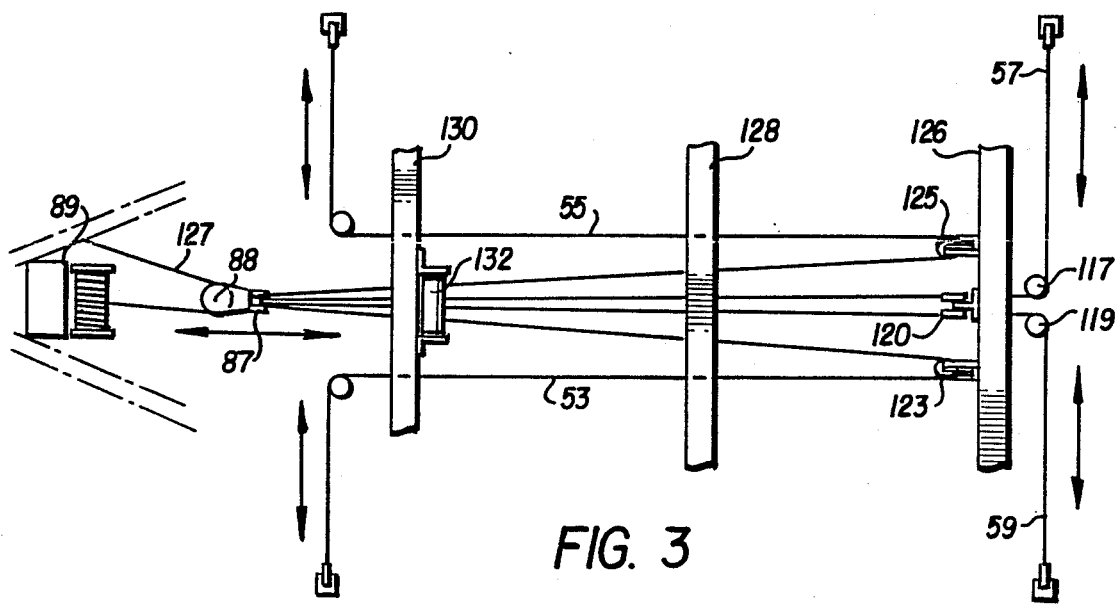
FIG. 3 is a partial top view of FIG. 2 showing the cable arrangement.

Turning now to FIGS. 2 and 3, it can be seen that the cables extend downwardly through their associated columns and, using a pulley system, are attached to D-ring 87, which in turn is secured to snatch block 88. Cable 127 passes around the pulley in the snatch block and is controlled by motorized winch 89. More specifically, cable 53 passes downwardly over pulley 103 (which is located at the bottom of column 31), over pulley 113, through an orifice in cross-brace 130 and another orifice in cross-brace 128, passes over pulley 123, under roller 132, and is secured at its distal end to D-ring 87.

In like manner, cable 55 passes over pulley 105 and pulley 115, through cross-braces 130 and 128, over pulley 125 and under roller 132, to D-ring 87.

Rear cable 57 passes downwardly through the column, over pulleys 107 and 117, under roller 132, and to D-ring 87. Cable 59 passes downwardly through the column, over pulleys 109 and 119, under roller 132, and to D-ring 87. Sheath 120 maintains cables 57 and 59 in alignment.

Figure 4:
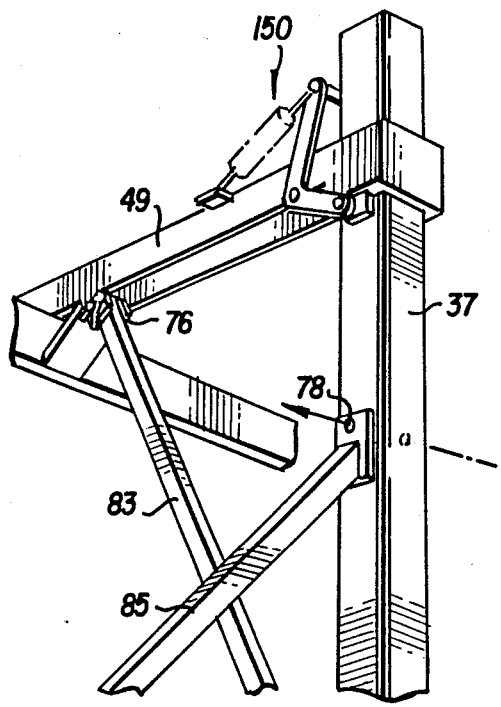
FIG. 4 is a partial perspective view showing the attachment of support members between the columns and the boat cradle support beams.

FIG. 4 illustrates the means for removably securing braces 83 and 85 to arm 49 and column 37, respectively. Brace 83 fits within flange 76 and is secured thereto by a removable pin. Brace 85 terminates in plate 78 having a threaded borehole which mates with a borehole in column 37. Bolt 80 passes through the borehole in column 37 and is removably secured within the threaded borehole in plate 78. Handle 80' is welded to the bolt head to facilitate tightening of the bolt.

Figure 5:
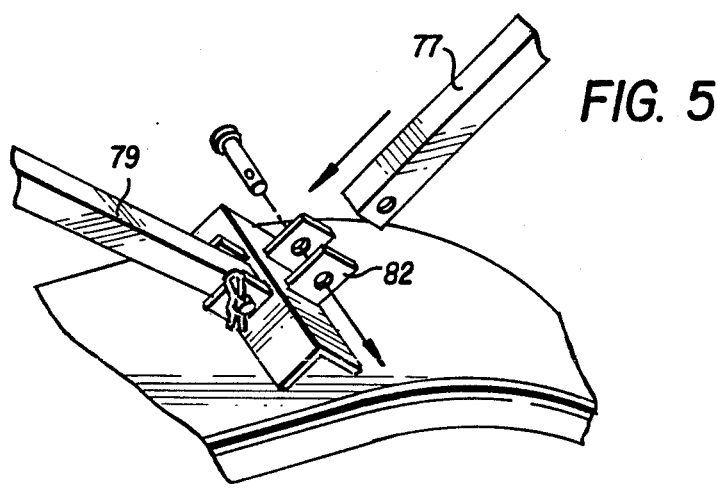
FIG. 5 is a perspective view of the lower end of a pair of braces used as illustrated in FIG. 1.

FIG. 5 shows brace 77 and mating brace 79 secured to the fender of the trailer. Brace 77 fits in flange 82 and is secured by a removable pin, while brace 79 fits in a similar flange and is also secured by a removable pin.

Figure 6:
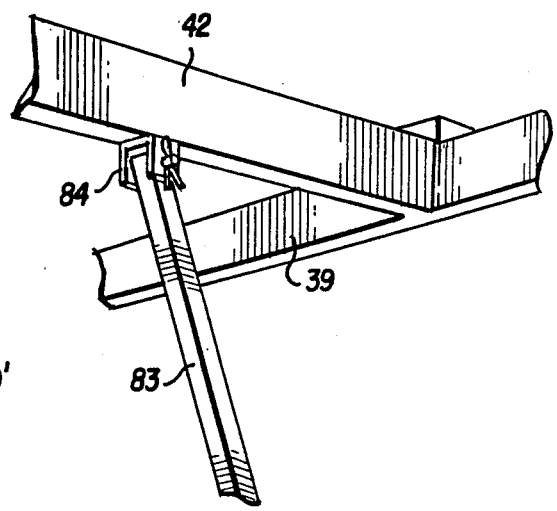
FIG. 6 is a perspective view of one of the braces attached to the trailer structure components of FIG. 1.

FIG. 6 shows brace 83 within flange 84 on crossbrace 42 held in place by a removable pin.

Figure 7:
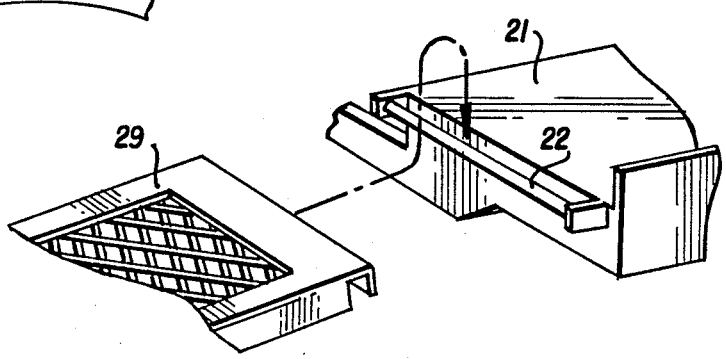
FIG. 7 is a partial perspective view showing how the ramps are attached to the trailer of FIG. 1.

FIG. 7 shows ramps 29 removed from the rails of the trailer. As shown in FIG. 1, ramps 29 are stored in the trailer when not in use.

Figure 8:
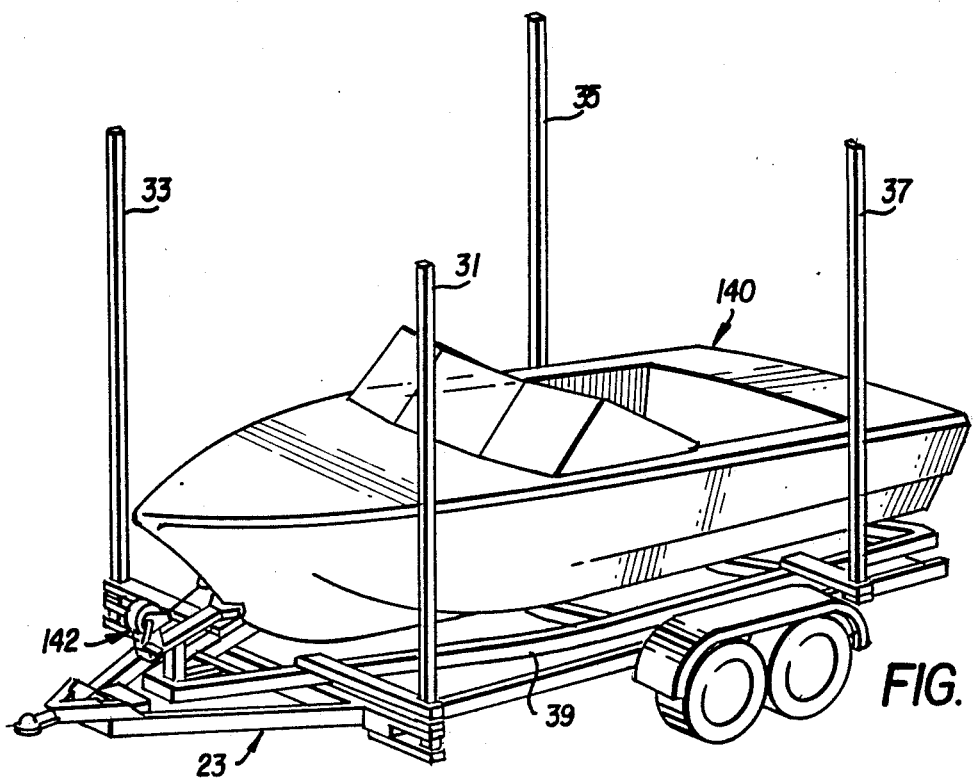
FIG. 8 is a perspective view of a boat in place on the trailer before it is raised.

FIG. 8 shows the boat having been raised onto cradle 39 by means of standard winch 142. The boat is secured in place on the cradle in the usual manner and is then raised by the cables through the use of motorized winch 89 to a height which is sufficient to allow a vehicle such as a car to be driven onto the rails.

Figure 9:
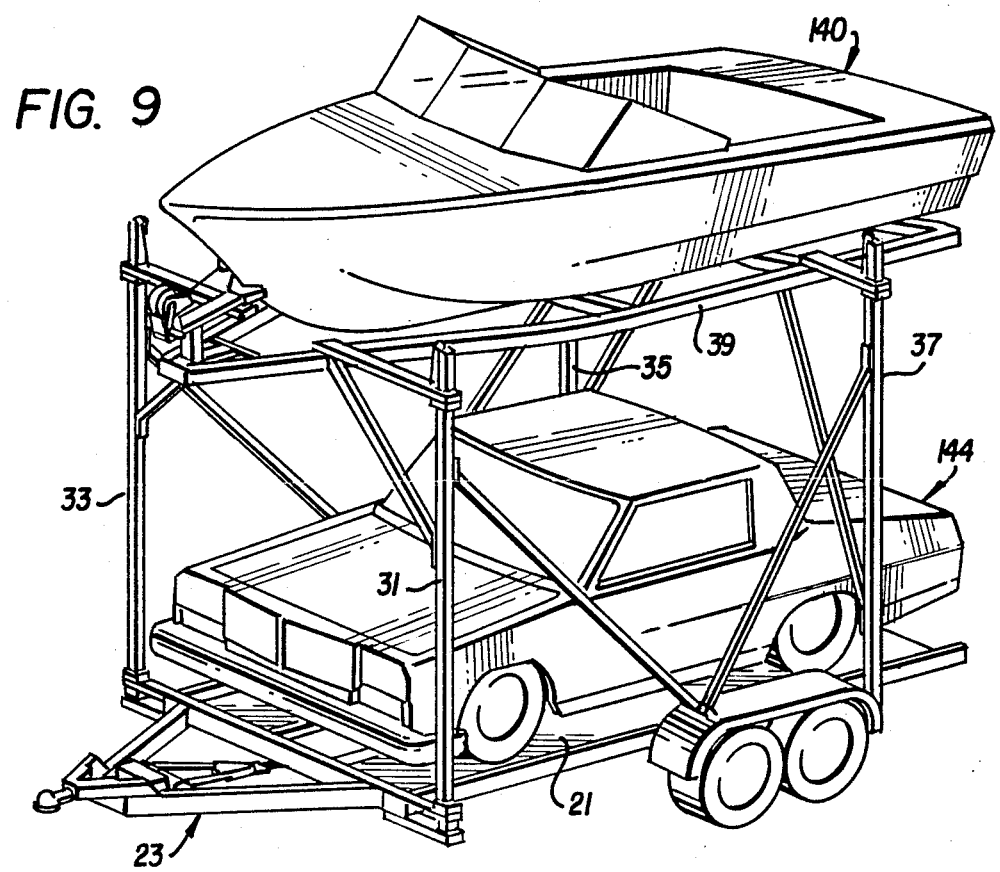
FIG. 9 is a perspective view similar to FIG. 1, showing the boat and the vehicle in place on the trailer.

FIG. 9 shows the automobile in place on the rails and secured to the frame in the usual manner. After the automobile is in place, the boat may be lowered to a point where it just clears the roof of the automobile. This streamlines the trailer and provides the most advantageous position for lowering the center of gravity of the entire trailer.

In order to support the boat once it has been adjusted to its raised position, and to assure that any failure or breakage of the cables does not allow the cradle to be lowered so as to damage the automobile, the present invention provides a safety lock on each of the columns. These locks are shown and described in FIGS. 10–13. The lock on each column is the same, and only one such lock will be described.

Figure 10:
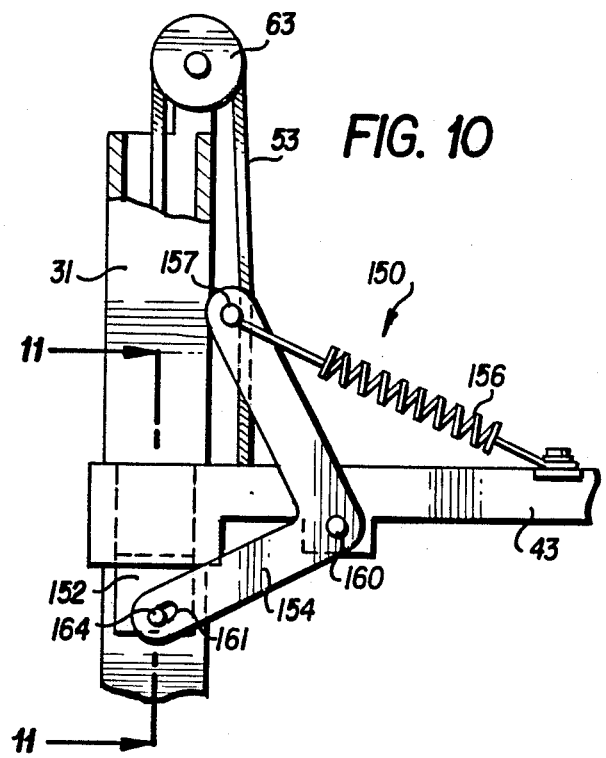
FIG. 10 is a partial plan view of a safety lock for use with the present invention.
Figure 11:
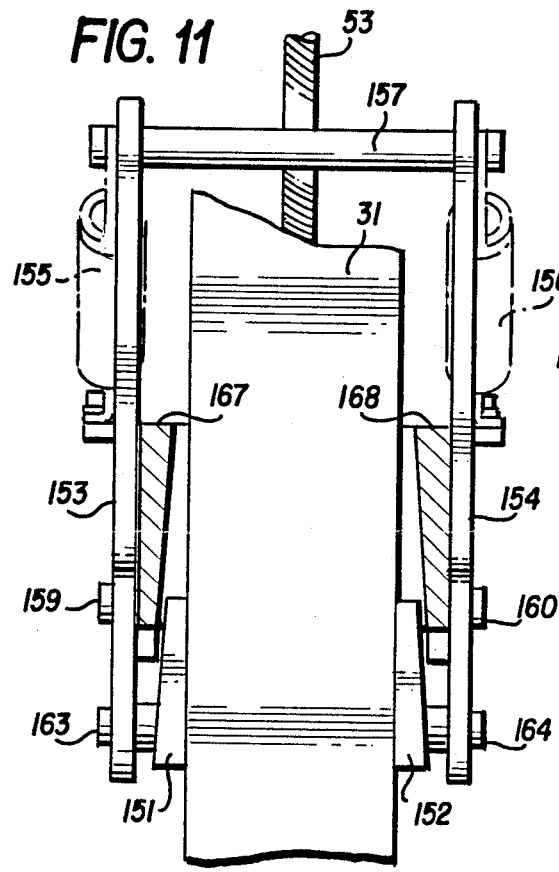
FIG. 11 is a side view of the safety lock of FIG. 10.

FIGS. 10 and 11 show a plan view and a side view of the safety lock in its inoperative position. Safety lock 150 includes opposed sliding wedges 151 and 152, which abut against opposite sides of column 31. Opposed operating arms 153 and 154 support cable bar 157, which extends between cable 53 and column 31. Tension springs 155 and 156 are secured to cable bar 157 at one end and to arm 43 at the other end. The other end of operating arm 153 terminates in slot 161, and the other end of operating arm 154 terminates in a similar slot on arm 154. These slots pass over pins 163 and 164. Wedge members 167 and 168 are secured to the inner surface of arm 43 by means such as welding.

As long as there is tension on cable 53, it will bear against cable bar 157 and hold operating arm 153 in the position shown in FIGS. 10 and 11 (against the bias of springs 155 and 156). Loss of tension, however, causes operation of the safety lock.

Figure 12:
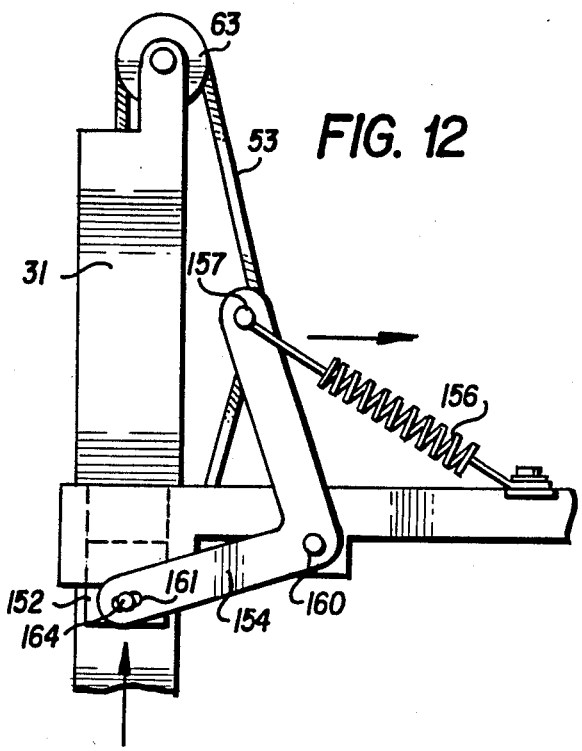
FIG. 12 is plan view of the safety lock of FIG. 10 having been actuated.
Figure 13:
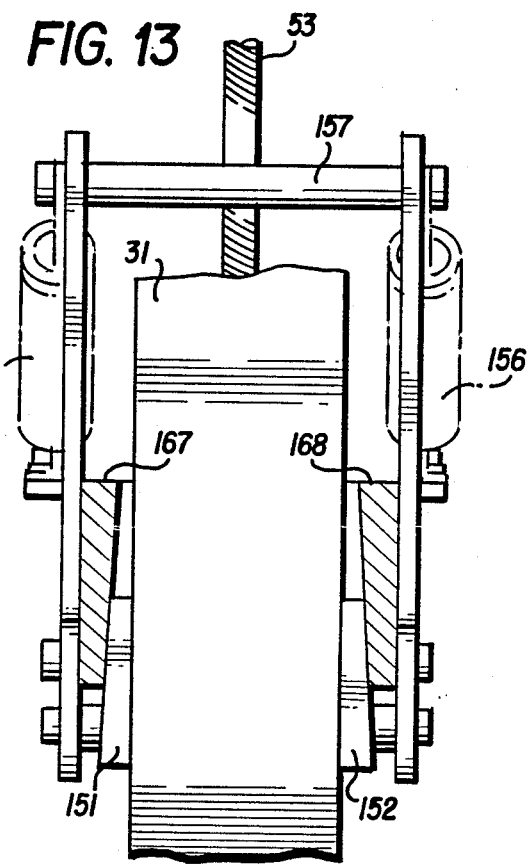
FIG. 13 is a side view of the lock of FIG. 12.

FIGS. 12 and 13 show the safety lock in its operative position. Cable 53 has gone slack, either through breakage or some other malfunction, and no longer exerts pressure on cable bar 57. This permits springs 155 and 156 to rotate operating arm 153 and 154 clockwise about their pivot points 159, and 160 thus causing movement of wedges 151 and 152 upward against fixed wedges 167 and 168. The upward force on sliding wedges 151 and 152 will increase due to friction between the sliding wedges and supporting column 31. This will move sliding wedges 151 and 152 into contact with fixed wedges 167 and 168. It is preferable that the mating surfaces of the fixed and sliding wedges be lubricated to facilitate the action.

Once any repairs are made to the cables or they are put back into operation, a lifting action will raise the cradle arms, placing tension on cable 53, thereby returning operating arms 153 and 154 and associated sliding wedges to their disengaged position against the bias of springs 155 and 156.

As will now be evident, the present invention provides a trailer for carrying a boat and a vehicle which includes a minimum of moving parts and which is easily operated.

The above description and drawings are illustrative, only, since equivalent structural components may be substituted without departing from the invention, the scope of which is to be limited only by the following claims.

I claim:

1. A vehicle/boat trailer for transporting a vehicle with a boat supported above the vehicle comprising
    a vehicle transport frame having wheels, supporting rails, and a trailer hitch;
    a vertical column mounted substantially at each corner of said transport frame;
    a boat cradle;
    means for slidably mounting said boat cradle about said vertical columns;
    a pulley mounted substantially at the top of each column;
    a cable mounted at one end to each mounting means and passing over the adjacent pulley;
    winch means;
    means for connecting the other end of said cables to said winch means for raising and lowering said boat cradle;
    spring-actuated safety lock means permanently secured between each of said slidable mounting means and said vertical columns for supporting said boat cradle in the event of a cable failure; and
    longitudinal braces removably secured between said vertical columns and transverse braces removably secured between said vertical columns and said boat cradle, said transverse braces being secured to said column when said boat cradle is in its raised position.

2. The vehicle/boat trailer of claim 1 wherein said vertical columns are hollow and said cables pass over said pulleys 3. The vehicle/boat trailer of claim 1 further comprising removable ramps for loading a vehicle on said rails.

4. The vehicle/boat trailer of claim 1 wherein said means for connecting the other end of said cables to said winch comprises
    a plurality of pulleys mounted on said frame for accepting and guiding said cables; and
    a snatch block secured between the other end of said cables and said winch.

* * * * *